UNITED STATES PATENT OFFICE.

ELLERT W. DAHL, OF NEW YORK, N. Y.

PROCESS OF MAKING WHITE LEAD.

SPECIFICATION forming part of Letters Patent No. 452,263, dated May 12, 1891.

Application filed April 15, 1890. Serial No. 348,059. (Specimens.)

*To all whom it may concern:*

Be it known that I, ELLERT W. DAHL, a subject of the King of Norway, residing in the city of New York, have invented a new and useful Process of Making White Lead, of which the following is a specification.

The process which I have invented consists, substantially, in exposing metallic lead to the successive action of acetic acid and air preferably heated, whereby the surface of the lead is oxidized and converted into basic acetate of lead, dissolving and removing such acetate by means of dilute acetic acid, which not only removes the basic acetate but attacks the metallic lead, forming neutral acetate of lead, and then decanting the solution or mixture of basic and neutral acetate so formed and mixing it with a carbonate of an alkali, such as the carbonate of soda, whereby carbonate of lead is formed as a precipitate.

In carrying out my invention in the manner I have found most practicable the metallic lead in the form of strips or sheets, but preferably in the form known as "feathers," is packed in a suitable corroding-tank or corroder, and in order to expose as much of the surface of such sheets or strips as possible it is preferable to arrange them vertically in the vessel. Dilute acetic acid is then poured or sprinkled upon the lead, and when the surface of the strips or sheets is wet with the acid hot water is poured upon the lead, or preferably a jet of steam is passed through the corroder a few seconds, to heat the acid and accelerate its action. The corroder is then opened and a blast of air, preferably heated, is forced through it for a sufficient time to permit the lead to absorb as much oxygen as it will take up. From one to four hours will usually be sufficient for this purpose, depending upon the temperature of the air-blast and the condition of the atmosphere, when the surface of the lead will become thoroughly oxidized and present a whitish appearance. Dilute acetic acid is then poured through the lead, which washes off and dissolves the coating of basic acetate of lead formed on the surface of the strips or feathers and also attacks the metallic lead, forming neutral acetate of lead, which goes into the solution with the basic acetate. The solution thus formed is a mixture of basic and neutral acetates of lead. It is important that the acid used for this part of the process should be very dilute, the acid forming from about five to ten per cent. of the liquor. The combined solution or mixture thus obtained is decanted off and the metallic lead remaining in the vessel is again subjected to the blast of air, sufficient acid usually remaining upon its surface to cause it to be oxidized by the air, and this process is continued until the metallic lead is all converted into acetates and carried off in the solution, as described. This part of the process may be a continuous one, fresh metallic lead being added above as that below is consumed, and after the process is first started fresh acid is added from time to time only as required. When the combined acetate solution has attained a sufficient density, it is drawn off into a settling-tank, where it is allowed to remain until such brown oxide and other impurities as may be contained in it have settled to the bottom of the tank. The clear solution remaining is then decanted into a precipitating-tank, where it is stirred briskly and a suitable carbonate of an alkali, such as the carbonate of soda, preferably in the anhydrous solid form, is added in sufficient quantity to decompose the acetates and precipitate the lead in the form of basic carbonate of lead. The liquid of the solution is then drawn off and the precipitate is thoroughly washed with water to dissolve and remove any free alkali remaining in it. The basic carbonate of lead so obtained is treated and prepared for use in the manner ordinarily employed for that purpose.

Instead of sprinkling the metallic lead with acetic acid after it is placed in the corroder, it may be passed through a trough filled with dilute acid instead of water in the process of converting it into feathers, and the feathers so treated may be packed in the corroder and the blast of air applied at once without applying hot water or steam.

If desired, the acetic acid may be put in the corroder in an undiluted form and be diluted and brought into contact with all parts of the surface of the lead by the subsequent introduction of hot water or steam, which will then have the function of diluting the acid as well as of heating it and hastening the process. I prefer to make use of heated air for oxidizing the lead, because it shortens the the process very materially, and for the same reason I prefer to use a blast rather than to depend on the mere exposure of the lead to the atmosphere.

My improved process is much more rapid and economical than those heretofore employed, the materials and reagents used are cheap and readily obtainable, and the product is amorphous in structure and superior in quality to that obtained by the ordinary processes heretofore in use. It is exceedingly white, spongy, and so friable that it can be reduced to an impalpable powder by simple pressure of the finger. It grinds perfectly in linseed-oil, is soluble without residuum in acetic acid, in which solution it is precipitated by oxalic acid in the same form as the highest standard white lead heretofore produced, and is free from foreign substances. When ground in linseed-oil and afterward diluted with turpentine, it holds in suspension for a long time, a feature which is particularly desirable in the manufacture of mixed paints.

In the manufacture of chrome-yellow and chrome-green by the German process it produces a very brilliant color, as is also the case in the manufacture of artificial vermilion of a purple tint, in which, when mixed with orange mineral as its basis and precipitated simultaneously with eosinate of lead, it gives a peculiar brightness to the red which otherwise could only be obtained from oxide of zinc. It is especially useful as a pigment on account of its great staining and covering properties, which are due to the large proportion of hydrated oxide present in its composition. I obtain this superior product by my new process, which is cheap, simple, and rapid, whereas to obtain an equally good result by older methods would involve so much time, labor, and expense that the cost of manufacture would be practically prohibitive of its use except for special and restricted purposes.

What I claim as my invention is—

1. The process of making white lead, which consists in forming a combined solution of basic acetate of lead and neutral acetate of lead by exposing metallic lead to the successive action of dilute acetic acid and air, and then precipitating the said basic and neutral acetates in the form of basic carbonate of lead by means of a carbonate of an alkali, substantially as described.

2. The process of making white lead, which consists in exposing metallic lead to the alternate and successive action of dilute acetic acid and hot air, whereby a solution of basic and neutral acetates of lead is formed, decanting and clarifying such solution, and finally precipitating basic carbonate of lead from said basic and neutral acetates by adding to the solution a suitable carbonate of an alkali, substantially as described.

3. The process of making white lead, which consists in exposing metallic lead to the alternate and successive action of hot diluted acetic acid and hot air, whereby a solution of basic and neutral acetates of lead is formed and precipitating basic carbonate of lead from such solution by adding thereto a suitable carbonate of an alkali, substantially as described.

This specification signed and witnessed this 14th day of April, 1890.

ELLERT W. DAHL.

Witnesses:
HENRY F. NEWBURY,
LEONARD E. CURTIS.